United States Patent

Sagstetter et al.

[11] Patent Number: 5,372,678
[45] Date of Patent: Dec. 13, 1994

[54] MANUFACTURE OF CALCIUM HYDROSILICATE BOUND FIBERBOARD

[75] Inventors: Robert Sagstetter, Kleinlangheim; Adolf Bauer, Schwarzach, both of Germany

[73] Assignee: Eurit Bauelemente GmbH, Dettelbach, Germany

[21] Appl. No.: 839,809

[22] Filed: Feb. 21, 1992

[30] Foreign Application Priority Data

Feb. 26, 1991 [DE] Germany ............... 41060105

[51] Int. Cl.$^5$ ............................................. D21F 13/00
[52] U.S. Cl. ....................................... 162/225; 162/224
[58] Field of Search ............... 264/86, 87, 109, 333; 106/609, 730, 731, 737, 805; 162/218, 222, 225, 226, 220, 224

[56] References Cited

U.S. PATENT DOCUMENTS

| | | | |
|---|---|---|---|
| 445,143 | 1/1891 | Hull | 162/219 |
| 2,699,097 | 1/1955 | Binkley | 106/797 |
| 3,864,290 | 2/1975 | Peppler et al. | 106/727 |
| 3,957,522 | 5/1976 | Matsuo | 264/87 |
| 4,079,108 | 3/1978 | Farfor | 264/87 |
| 4,132,555 | 1/1979 | Barrable | 106/731 |
| 4,132,590 | 1/1979 | Yamada et al. | 162/221 |
| 4,144,121 | 3/1979 | Otouma et al. | 162/145 |
| 4,219,515 | 8/1980 | Helser | 264/86 |
| 4,497,662 | 2/1985 | Chisholm et al. | 264/86 |
| 4,840,672 | 6/1989 | Baes | 106/731 |

FOREIGN PATENT DOCUMENTS

| | | |
|---|---|---|
| 0135992 | 4/1985 | European Pat. Off. ............ 162/218 |
| 0381847 | 8/1990 | European Pat. Off. . |
| 2620865 | 12/1976 | Germany . |
| 51-80326 | 7/1976 | Japan . |
| 1277272 | 6/1972 | United Kingdom . |
| 1404001 | 8/1975 | United Kingdom . |

OTHER PUBLICATIONS

The Dictionary of Paper, 3rd Edition, New York, George Bantc Co. Inc 1965, pp. 136 and 165.
Pulp and Paper Dictionary, San Francisco, Miller Freeman Pub. (1986) pp. 120 and 217.

*Primary Examiner*—W. Gary Jones
*Assistant Examiner*—Brenda Lamb
*Attorney, Agent, or Firm*—Townsend and Townsend Khourie and Crew

[57] ABSTRACT

Calcium hydrosilicate bound fiberboard, in particular double-deck board, is manufactured in a process wherein a fiber-binder-filler mixture having a water content of 40 to 45% by weight and a solids content of 55 to 60% by weight is prepared by digesting cellulose fibers in an amount of from 2 to 12% by weight of the solids content with water and mixing them with fillers and with a binder comprising cement and/or lime hydrate and substances containing reactive calcium silicates to form a thick pasty mixture, whereupon the thick pasty mixture is introduced in a predetermined amount into the frame of a bottom mold of a single-shot press which further includes a top mold. The mixture is essentially leveled out, formed by closing top and bottom mold, and, via dewatering fabrics and channels in the top and bottom molds, dewatered. Finally, the mixture is compacted and vented, whereupon the raw board is demolded and autoclaved.

12 Claims, 1 Drawing Sheet

MANUFACTURE OF CALCIUM HYDROSILICATE BOUND FIBERBOARD

BACKGROUND OF THE INVENTION

The present invention lies in the field of processes for manufacturing calcium hydrosilicate bound fiberboard.

It is known that cement bound fiberboard can be produced by applying a slurry containing a mixture of cellulose fiber, cement and a large excess of water to a wire-cloth. The thin layers so produced are superposed on one another while moist, pressed together, and finally cut to size and autoclaved. The wire-cloth of the papermaker's machine limits the thickness of the individual layers and consequently requires layering, an approach that, in certain circumstances, results in layers arranged on top of one another having different moisture contents. Because water is a transport medium, the mechanical properties of a layer of the fiberboard can be anisotropic. However, layering, when done with an appropriate offset arrangement, can to some extent eliminate this anisotropy in the mechanical properties. Unfortunately, such layering is costly. Moreover, layering, is responsible for the fact that, when the raw board thus produced is autoclaved, it is prone to dishing, i.e., dish-like warpage at the edges, which impairs product quality and necessitates reworking.

SUMMARY OF THE INVENTION

The present invention provides a process of the kind mentioned above whereby fiberboard of uniform and consistent quality is producible in a simplified manner.

This is achieved by a process for manufacturing calcium hydrosilicate bound fiberboard. In particular, the present invention includes a process for making double-deck board, in which a fiber-binder-filler mixture (having a water content of 40 to 45% by weight and a solids content of 55 to 60% by weight) is prepared by digesting cellulose fibers in an amount of from 2 to 12% by weight of the solids content with water and mixing them with fillers and with a binder that includes cement and/or lime hydrate and substances containing reactive calcium silicates to form a thick pasty mixture. This mixture is then introduced in a predetermined amount into the frame of a bottom mold of a single-shot press which includes a top mold. Subsequently, the mixture is substantially leveled out, formed by closing top and bottom mold, and, via dewatering fabrics and channels in the top and bottom molds, dewatered, compacted and vented. The raw board thus formed is then demolded and autoclaved.

In the course of the process, the binder cement, for example Portland, iron Portland or blast furnace cement, reacts (through its lime content, or the free lime used as lime hydrate) with reactive calcium silicate during autoclaving to form strength-producing CsH phases. Suitable reactive calcium silicates are microsilicate (particularly when cement is used), finely ground quartz powder, latently hydraulic substances such as pozzuolanas (for example fly ash or $SiO_2$-rich slags) which react in part with the free or freed lime and can also act in part as filler or additional filler. Fly ash, among other materials, which can be added in a proportion of up to 25% by weight of the solids content, has the favorable effect on the fiber-binder-filler mixture of reducing the water required and makes the mixture more malleable.

The cellulose fibers are preferably used in an amount of from 4 to 7% by weight of the solids content of the mixture and preferably as sulfate cellulose and may be used with other reinforcing fibers.

Preferably, the solids content of the mixture is prepared (as a whole or in part) from 2–12% by weight (and preferably 4–7% by weight) of cellulose fiber, 2–12% by weight (and preferably 6–10% by weight) of microsilica and up to 25% by weight (and preferably 10–20% by weight) of latently hydraulic substances, in particular fly ash.

DESCRIPTION OF THE PREFERRED EMBODIMENTS

Figure 1:
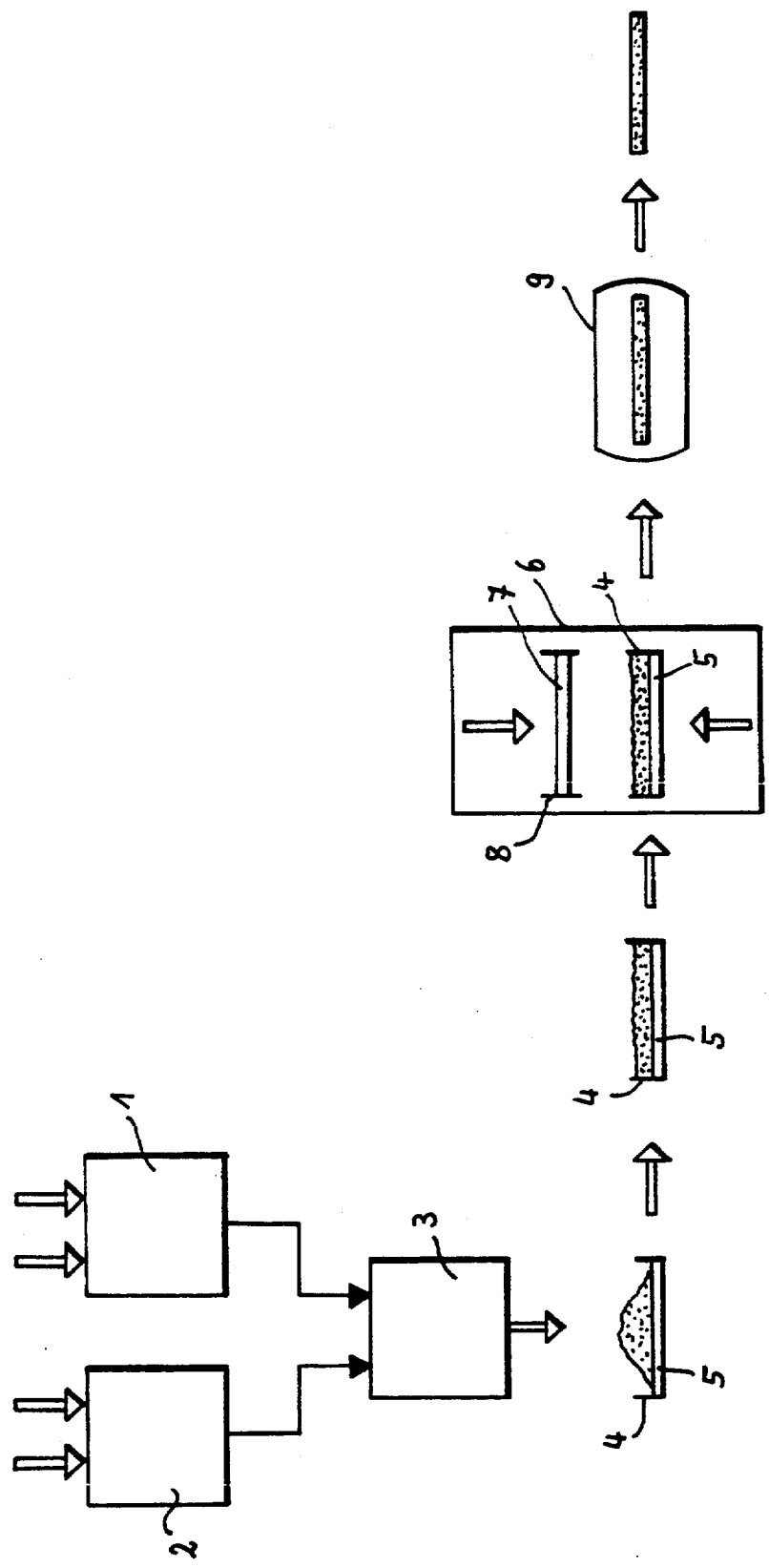
FIG. 1 is a flow diagram of a preferred process of the present invention.

The invention will now be more particularly described with reference to the accompanying process flow diagram.

The cellulose fibers, which may be paper and/or pulp fibers with or without a proportion of comminuted waste paper, are pulped in a pulper 1 while at the same time the other solid components are mixed in a dry mixer 2. The pulp from the pulper 1 and the dry mixture from dry mixer 2 are mixed in a wet mixer 3 to form a thick pasty mixture, to which may additionally be added a liquid solidification accelerant for the cement, if the mixture contains cement.

The thick pasty mixture is introduced in the necessary amount, which can be measured gravimetrically or volumetrically, into a bottom frame 4 surrounding a bottom mold 5 of a single-shot press 6. The mixture, which initially forms a pile having a low tendency to flatten, is substantially leveled out in the bottom frame 4. This can be effected by, for example, riddling, raking or spreading apart by means of a plunger. Since the mixture has the consistency of a thick paste, it would otherwise not be sufficiently distributed over the area bounded by the bottom frame 4 within the single-shot press 6, which would result in quality-reducing thickness fluctuations which might also make costly working over necessary. The leveling, by contrast, produces fiberboard of uniform, consistent quality.

After leveling, the mixture is formed within the single-shot press 6 into board of appropriate dimensions, as determined by bottom frame 4, by closing top mold 7 and bottom mold 5. The mixture is then dewatered so that the fibers form a fleece. For this purpose, the top and bottom molds 7 and 5 are each provided with a dewatering fabric and channels. A wire mesh is advantageously arranged between the dewatering fabric and the upper and lower molds 7 and 5, respectively, to prevent the dewatering fabric from being pressed into the openings of the dewatering channels. The top mold 7 is advantageously movable up and down within a top frame 8, which is itself movable up and down and which, on pressing, closely engages the bottom frame 4. After the raw fiberboard has been formed, the top mold holds it back in order to deposit it on a transfer means for transferring raw board into an autoclave 9. The raw board thus produced in one operation is then autoclaved to initiate the strength-producing reactions, i.e., formation of CsH phases. Subsequently, a small amount of grinding may be necessary as working over.

The thickness of the fiberboard can be controlled by adjusting the amount of mixture introduced into the bottom frame 4, if a constant molding pressure is employed. Typical molding pressures are of the order of 50 kp/cm².

Prior to every molding operation the parts of the press 6 which come into contact with the mixture are sprayed with release agent in order to avoid caking. This prevents anisotropy, multilayered structures, or susceptibility to dishing and avoids the need to cut the raw board to size. In addition, the amount of water to be removed from the mixture is significantly reduced.

Having thus described the invention in terms of preferred embodiments, the true scope of the invention is defined by the following claims.

What is claimed is:

1. A process for manufacturing calcium hydrosilicate bound fiberboard in a double-deck board, comprising the following steps:

pulping cellulose fibers;

mixing said cellulose fibers with a binder including cement and/or lime hydrate and reactive calcium silicate and a filler to form a pasty fiber-binder-filler mixture having a water content of about 40 to about 45% by weight and solids content of about 55 to about 60% by weight, said solids content including about 2 to about 12% cellulose fibers by weight;

introducing said pasty fiber-binder-filler mixture in a predetermined amount into a frame of a bottom mold of a single-shot press, said press including a top mold;

substantially leveling said pasty fiber-binder-filler mixture;

closing said top and bottom molds;

compressing said top and bottom mold to form a raw board by compaction under dewatering and venting said pasty fiber-binder-filler mixture via dewatering fabrics and channels in said top and bottom molds;

demolding said raw board; and autoclaving said raw board.

2. The process of claim 1, wherein the solids content includes from about 4 to about 7% by weight of cellulose fiber.

3. The process of claim 1, wherein the cement is Portland, iron Portland or blast furnace cement.

4. The process of claim 1, wherein the solids content includes from about 2 to about 12% by weight microsilica, and about 10 to about 20% by weight of latently hydraulic substances selected from the group consisting of pozzuolanic substances, wherein the remainder of said solids content includes cement and said cellulose fiber.

5. The process of claim 4, wherein the pozzuolanic substances include fly ash.

6. The process of claim 4, wherein said solids content includes from about 10% to about 20% by weight micro silica.

7. The process of claim 1, wherein the pasty fiber-binder-filler mixture further comprises a liquid hardening accelerant for the cement.

8. The process of claim 1, wherein said pasty fiber-binder-filler mixture further comprises finely ground quartz powder as co-reactant to lime hydrate and as filler.

9. The process of claim 1, wherein the step of leveling is effected by riddling, raking or spreading by means of a plunger.

10. The process of claim 1, wherein the frame and the dewatering fabrics of the single-shot press are each sprayed with a release agent.

11. The process of claim 1, wherein the cellulose fibers used are selected from the group consisting of paper, pulp fibers and comminuted waste paper.

12. The process of claim 1, wherein the solids other than the cellulose fibers are premixed dry and mixed into the pulp formed by the cellulose fibers.

* * * * *